United States Patent
Du et al.

(10) Patent No.: US 6,787,123 B2
(45) Date of Patent: Sep. 7, 2004

(54) RARE EARTH ZEOLITE Y AND THE PREPARATION PROCESS THEREOF

(75) Inventors: Jun Du, Beijing (CN); Zheng Li, Beijing (CN); Zhijian Da, Beijing (CN); Mingyuan He, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 19 days.

(21) Appl. No.: 10/132,911

(22) Filed: Apr. 26, 2002

(65) Prior Publication Data

US 2003/0064881 A1 Apr. 3, 2003

(30) Foreign Application Priority Data

Apr. 28, 2001 (CN) .......................... 01115612 A
Apr. 28, 2001 (CN) .......................... 01115613 A

(51) Int. Cl.$^7$ ................... C01B 39/24; B01J 29/08
(52) U.S. Cl. ................. 423/713; 423/DIG. 21; 502/79; 502/85
(58) Field of Search ................ 423/700, 713; 502/DIG. 21, 65, 73, 79, 85

(56) References Cited

U.S. PATENT DOCUMENTS

| 3,595,611 A | | 7/1971 | McDaniel et al. | |
| 4,192,778 A | | 3/1980 | Alafandi et al. | ........ 252/455 Z |
| 4,218,307 A | | 8/1980 | McDaniel | ................ 208/120 |
| 4,429,053 A | * | 1/1984 | Ward | ................ 502/65 |
| 4,711,770 A | * | 12/1987 | Skeels et al. | ............ 423/713 |
| 5,145,817 A | * | 9/1992 | Sherrod | ................ 502/65 |
| 5,262,141 A | | 11/1993 | Skeels | ................ 423/328.1 |
| 5,535,817 A | * | 7/1996 | Dunne | ............ 165/104.12 |
| 5,646,082 A | * | 7/1997 | Tan-no et al. | ............ 502/65 |

FOREIGN PATENT DOCUMENTS

| CN | 1057977 | 1/1992 |
| EP | 0 139 092 A1 | 5/1985 |
| JP | 2-20562 | 1/1990 |

* cited by examiner

Primary Examiner—David Sample
(74) Attorney, Agent, or Firm—Greenblum & Bernstein, P.L.C.

(57) ABSTRACT

The present invention discloses a high stability rare earth zeolite Y with high rare earth and the preparation process thereof, which zeolite has a content of rare earth of 4–15 wt %, a unit cell constant of 2.450–2.458 nm, a differential thermal collapsed temperature of 1000–1056° C., a silica to alumina ratio of 8.3–8.8, and a content of sodium oxide less than 1.0 wt %. Said zeolite is prepared by drying a rare earth-containing zeolite Y, introducing gaseous silicon tetrachloride carried by dry air and reacting at a temperature of 150–600° C. for 10 min to 6 h, then purging with dry air and washing with de-cationized water to remove the soluble by-products. The rare earth zeolite Y possesses high activity and selectivity for cracking the heavy oils, high activity for hydrogen transfer, has good coke selectivity, can effectively increase the yield of light oils, and improve the quality of gasoline and thus can directly serve as an active component for preparing various hydrocarbon cracking catalysts.

8 Claims, No Drawings

RARE EARTH ZEOLITE Y AND THE PREPARATION PROCESS THEREOF

The present invention relates to a rare earth zeolite Y and the preparation process thereof Catalytically cracked gasoline is a major component of the vehicle gasoline. Now, catalytically cracked gasoline in China accounts for about 70% of the vehicle gasoline. In recent years, as more and more attention of the whole society is paid to the environmental protection, it becomes more and more urgent to produce the low olefin, low sulfur, high quality clean catalytically cracked gasoline. However, the heavier feedstock for catalytic cracking has put forward higher requirements for the catalytic cracking catalyst, which should not only have higher activity, better selectivity and higher hydrogen transfer activity, but also have higher hydrothermal stability.

As the major component of the catalytic cracking catalyst, zeolite Y has gone through the following developing stages:

NaY is inactive for catalytic reactions, and only after being changed into HY by exchanging $Na^-$ with $NH_4^+$, it possesses a pretty high activity. In 1960's, zeolites have already been used in oil refining. The stability of zeolites is always an important problem which should be taken into consideration in the catalyst preparation, and especially in catalytic cracking. Zeolites must possess good hydrothermal stability.

U.S. Pat. No. 3,384,572, and U.S. Pat. No. 3,506,440 indicate that HY prepared by exchanging $Na^+$ in zeolite with $NH_4^+$ has a pretty high activity but poor structure stability, which will lose its crystallinity in dry air at a temperature higher than 500° C., and its structure will be destroyed even when placed in air at room temperature. Rare earth exchanged HY (abbreviated as REHY) prepared by further partly replacing $NH_4^+$ with rare earth ions based on HY has very high activity, and has also overcome the shortcoming of poor thermal stability of HY With the further development of catalytic cracking of heavy oil, although REHY and REY prepared by hybrid exchanging with rare earth ions and $NH_4^+$ have high hydrogen transfer activity and cracking activity, it also has the problems that its initial unit cell contracts difficultly and that it can not be stable under high hydrothermal conditions, which exhibits as easy to produce coke and deactivate in the catalytic cracking unit.

U.S. Pat. No. 3,293,192 and C. V. M C Darid and P. K. Maher, in "Zeolite stability and ultrastable zeolite" (Zeolite Chemistry and Catalysis, Acs Monograph 171, Washington D.C., 1976, 285–231) described a procedure that NaY is exchanged with $NH_4^+$ in an aqueous solution and then the exchanged zeolite is calcined in steam at a temperature of 600° C. to 825° C., which can be carried out repeatedly. After such a treatment of multiple exchanging and calcining, the unit cells of the zeolite contract and achieve ultrastableness. Thus the ultrastable zeolite Y (abbreviated as USY) prepared by the hydrothermal process is obtained. Such kind of zeolite was widely used in 1990's, which is characterized in the less unit cell contraction, good thermal and hydrothermal stability, low hydrogen transfer activity and good coke selectivity, but also has the disadvantage of the limited activity and needs to improve its activity by exchanging with a solution of rare earth. USY has a rather high silica to alumina ratio and less cation sites in its framework, meanwhile partial crystal strcture collapsed and plugged the pores during ultrastabilization, which results in the small ion exchange capacity of the USY. Generally, the content of $RE_2O_3$ in the rare earth exchanged USY (abbreviated as REUSY) is up to 3–4 wt %, and a considerable amount of $RE_2O_3$ is absorbed at the outside of zeolite crystal.

In summary, although REY and REHY have high contents of rare earth, namely 10–20 wt % of $RE_2O_3$ in REY and 6–14 wt % of $RE_2O_3$ in REHY, and have higher activity and hydrogen transfer activity, the unit cell can not further contract. The unit cell constant $\alpha_0$ is generally between 2.468–2.470 nm, the hydrothermal stability is relative poor, and the differential thermal collapsed temperature thereof is 900–980° C. On the contrary, USY has a better unit cell contraction, namely $\alpha_0=2.445–2.450$ nm, a good hydrothermal stability, and the differential thermal collapsed temperature is higher than 1000° C., but it contains very little rare earth because it is very difficult for the rare earth cations to enter into the lattice of the crystal. Besides, the unit cells of the above two types of zeolites contract in a large extent after aging, and the equilibrium unit cell constant is only 2.425–2.428 nm; therefore the hydrogen transfer activity is low and it is hard to meet the requirement of the new cracking catalyst, e.g. the selective hydrogen transfer activity.

Presently, a mixture of rare earth exchanged ultrastable zeolite Y, i.e. rare earth-containing ultrastable zeolite Y (the content of $RE_2O_3$ in REUSY is usually about 3 wt %), moderate rare earth content zeolite REHY (the content of $RE_2O_3$ is usually 6–14 wt %) and high rare earth content zeolite REY (the content of $RE_2O_3$ is usually 10–20 wt %) are combined and mixed in different ratios when a cracking catalyst is prepared. Although the activity of the catalyst is improved, due to the poor hydrothermal stability of REHY and REY per se, the thermal and hydrothermal stability of the catalyst become poor; therefore the catalyst easily deactivates in operation, which is reflected by the low activity of equilibrium catalyst and the poor coke selectivity. However, the amount of REUSY is increased from the conventional 30–35% to 40% or even 45%, there is no doubt that the production cost will be greatly raised.

It is an object of the present invention to provide a zeolite Y which simultaneously has high intracrystalline rare earth content, smaller initial unit cell constant, good thermal and hydrothermal stability, and can be directly used to prepare cracking catalysts. It is till another object to provide a process for preparing such a zeolite Y.

The content of the intracrystalline rare earth of the zeolite Y according to the present invention on the basis of $RE_2O_3$ is 4–15 wt %, the unit cell constant thereof is 2.450–2.458 nm, and the differential thermal collapsed temperature thereof is 1000–1056° C.

The content of the intracrystalline rare earth of the zeolite Y according to the present invention on the basis of $RE_2O_3$ is preferably 6–12 wt %, and the unit cell constant thereof is preferably 2.452–2.456 nm. Such a zeolite has a higher framework silica to alumina ratio, which is 8.3–8.8, and a sodium oxide content less than 1.0 wt %, preferably 0.5 wt %.

The present invention also provides a process for preparing such a zeolite Y, which comprises: drying rare earth-containing zeolite Y as raw material so that the water content thereof is lower than 10 wt %, introducing gaseous silicon tetrachloride carried by dry air in a zeolite Y to silicon tetrachloride weight ratio of 1:0.1–0.9 and reacting at a temperature ranging from 150° C. to 600° C. for 10 min-6 b, then purging with dry air for 5 min-2 h, and washing with de-cationized water to remove the residual soluble by-products such as $Na^-$, $Cl^-$, $Al^{3+}$ and the is like in the zeolite.

In the provided process, said rare earth-containing zeolite Y can be either commercial products of REY and REHY, or the product derived from NaY by rare earth exchanging.

Generally, the content of the rare earth in said commercial product of REHY on the basis of $RE_2O_3$ is 6–14 wt %, and the content of $Na_2O$ is hither than 2 wt %; the content of the rare earth in said commercial product of REY on the basis of $RE_2O_3$ is 10–20 wt %, and the content of $Na_2O$ is higher than 4 wt %.

In the preparation process of zeolite Y, said procedure of the rare earth exchanging NaY is that NaY having a silica to alumina ratio higher than 3.5 is exchanged with an aqueous solution of rare earth chloride in a weight ratio of $NaY:RECl_3:H_2O=1:0.1–0.25:5–15$ under the conditions of pH>3.5 and a temperature of 80–95° C. for 30–60 min with or without drying to obtain the zeolite.

Said raw material REY, REHY, or NaY exchanged with a rare earth chloride aqueous solution should be dried before the reaction to ensure that the water content is less than 10 wt %, preferably less than 5 wt %.

Said temperature for the reaction of the zeolite and gaseous silicon tetrachloride carried by dry air may be 150–600° C., preferably 200–500° C.

The rare earth zeolite Y according to the present invention has: (1) good thermal and hydrothermal stability, e.g., the unit cell size remains well after being treated under severe conditions of 100% steam at a temperature of 800° C. for 17 h; (2) good cracking activity and selectivity to heavy oils, selective hydrogen transfer activity and activity stability, good selectivity to coke, abilities to effectively improve the yield of light oils and improve the quality of gasoline, and a capacity to be directly used as an active component for preparing various hydrocarbon cracking catalysts.

The process for preparing the above rare earth zeolite Y according to the present invention makes full use of the characteristic of the gaseous silicon tetrachloride of easy diffusing into the pores of the zeolite, carries out the reaction of isomorphous substitution effectively, and realizes dealumination, silicon supplement, and sodium removal in one step without many times of exchange and calcination.

In addition, compared to the prior art described in CN 1127161A, the preparation process according to the present invention has wider raw material sources, which may be either REY and REHY or NaY; in particular when NaY is used as raw material, rare earth chloride does not need drying. The zeolite NaY is exchanged with the conventional aqueous solution of $RECl_3$, making full use of the characteristic of zeolite NaY's good adsorption and desorption, which significantly alleviate the uncertainty of the operation and severe preparation condition as to "mixing zeolite NaY with the pulverized rare earth while they are hot" taught in CN 1127161A.

The present invention will be further described below with examples, but is not limited thereto.

In the examples, the silica to alumina ratio is calculated by the following equation:

$$SiO_2/Al_2O_3 = \frac{(2.5858 - a_0)}{(a_0 - 2.4191)} \times 2$$

Wherein $\alpha_0$ is the unit cell constant of zeolite measured by X-ray diffraction method.

EXAMPLE 1

REY (a product of Zhoucun Catalyst Plant of Qilu Petrochemical Co., having a $RE_2O_3$ content of 19.2 wt %, wherein the content of $La_2O_3$ is 8.7 wt %, the content of $Ce_2O_3$ is 7.5 wt %, and the content of the other rare earth oxides is 2.3 wt %, a unit cell constant of 2.465 nm, a differential thermal collapsed temperature of 967° C., and a sodium oxide content of 4.5 wt %) was charged into a reactor and dried until the water content was less than 9 wt %, then reacted with $SiCl_4$ (made by Tianjin Dagu Chemical Plant, industrial grade) carried by dry air in a weight ratio of $REY:SiCl_4=1:0.7$ at 450° C. for 2 h, and then purged with dry air for 30 min, washed and filtered to remove $Cl^+$ and $Na^+$ in the zeolite, yielding the sample designated as RGY-1.

EXAMPLE 2

NaY (a product of Zhoucun Catalyst Plant of Qilu Petrochemical Co., having a silica to alumina ratio of 5.05, a unit cell constant of 2.466 nm, an alumina content of 21.2 wt %, and a sodium oxide content of 15.8 wt %) having a solid content of 75% was exchanged with rare earth in a ratio of $NaY:RECl_3:H_2O:=1:0.25:10$ under a condition of 80–95° C. for 40 min, and filtered and washed. The zeolite was reacted with $SiCl_4$ carried by dry air in a ratio of $NaY:SiCl_4=1:0.5$ at 550° C. for 60 min, and then purged with dry air for 120 min, washed and filtered to yield Sample No. RGY-2.

EXAMPLE 3

REHY (a product of Zhoucun Catalyst Plant of Qilu Petrochemical Co., having a $RE_2O_3$ content of 13.4 wt %, wherein the content of $La_2O_3$ is 8.8 wt %, the content of $Ce_2O_3$ is 2.7 wt %, and the content of the other rare earth oxides is 1.9 wt %, a unit cell constant of 2.469 nm, a differential thermal collapsed temperature of 985° C., and a sodium oxide content of 4.4 wt %) was charged into a reactor and dried until the water content was less than 5 wt %, then reacted with $SiCl_4$ carried by dry air in a ratio of $REHY:SiCl_4=1:0.8$ at 350° C. for 3 h, and then pureed with dry air for 60 min, washed and filtered, yielding Sample No. RGY-3.

EXAMPLE 4

Zeolite NaY (a product of Zhoucun Catalyst Plant of Qilu Petrochemical Co., having a silica to alumina ratio of 4.0, a unit cell constant of 2.473 nm, an alumina content of 24.8 wt %, and a sodium oxide content of 16 wt %) having a solid content of 85% was exchanged with rare earth in a ratio of $NaY.RECl_3:H_2O:=1:0.15:10$ under a condition of 80–90° C. for 60 min, so that the content of $RE_2O_3$ was 16 wt %, wherein the content of $La_2O_3$ is 4.16 wt %, the content of $Ce_2O_3$ is 8.16 wt %, and the content of the other rare earth oxides is 3.68 wt %. The zeolite was reacted with $SiCl_4$ carried by dry air in a ratio of $NaY:SiCl_4=1:0.9$ at 300° C. for 5 h, and then pruged with dry air for 20 min, washed and filtered, yielding Sample No. RGY-4.

EXAMPLE 5

Zeolite NaY (a product of Zhoucun Catalyst Plant of Qilu Petrochemical Co., having a silica to alumina ratio of 4.0, a unit cell constant of 2.473 nm, an alumina content of 24.8 wt %, and a sodium oxide content of 16 wt %) having a solid content of 65 wt % was exchanged with $RECl_3$ (made by Baotou Chemical Plant, industrial grade, wherein the content of $La_2O_3$ is 26 wt %, the content of $Ce_2O_3$ is 51 wt %, and the content of the other rare earth oxides is 23 wt %) in a ratio of $NaY:RECl_3:H_2O:=1:0.21:15$ under conditions of pH>3.5 and 80–95° C. for 30 min, then filtered, washed and dried. The dried sample was reacted with $SiCl_4$ carried by dry air in a ratio of $NaY:SiCl_4=1:0.5$ at 500° C. for 120 min, and then purged with dry air for 45 min, washed and filtered, yielding Sample No. RGY-5.

EXAMPLE 6

Zeolite NaY (a product of Zhoucun Catalyst Plant of Qilu Petrochemical Co., having a silica to alumina ratio of 4.5, a unit cell constant of 2.471 nm, an alumina content of 23.6 wt %, and a sodium oxide content of 15.8 wt %) having a solid content of 75% was exchanged with $RECl_3$ (made by Baotou Chemical Plant, industrial grade, wherein the content of $La_2O_3$ is 26 wt %, the content of $Ce_2O_3$ is 51 wt %, and the content of the other rare earth oxides is 23 wt %) in a ratio of $NaY:RECl_3:H_2O:=1:0.1:15$ under conditions of pH>3.5 and 80–95° C. for 40 min, and then filtered, washed and dried. The sample was reacted with $SiCl_4$ carried by dry air in a ratio of $NaY:SiCl_4=1:0.5$ at 200° C. for 120 min, and then purged with dry air for 70 min, washed and filtered, yielding Sample No. RGY-6.

EXAMPLE 7

Zeolite NaY (a product of Zhoucun Catalyst Plant of Qilu Petrochemical Co., having a silica to alumina ratio of 4.0, a unit cell constant of 2.473 nm, an alumina content of 23.8 wt %, and a sodium oxide content of 16 wt %) having a solid content of 80% was exchanged with $RECl_3$ (made by Baotou Chemical Plant, industrial grade, wherein the content of $La_2O_3$ is 26 wt %, the content of $Ce_2O_3$ is 51 wt %, and the content of the other rare earth oxides is 23 wt %) in a ratio of $NaY:RECl_3:H_2O:=1:0.1:10$ under conditions of pH>3.5, 80–95° C. for 40 min, and then filtered, washed and dried. The dried sample was reacted with $SiCl_4$ carried by dry air in a ratio of $NaY:SiCl_4=1:0.5$ at 250° C. for 120 min, and then purged with dry air for 20 min, washed and filtered, yielding Sample No. RGY-7.

EXAMPLE 8

Zeolite NaY (a product of Zhoucun Catalyst Plant of Qilu Petrochemical Co., having a silica to alumina ratio of 5.05, a unit cell constant of 2.466 nm, an alumina content of 21.2 wt %, and a sodium oxide content of 15.8 wt %) having a solid content of 75% was exchanged with $RECl_3$ (made by Baotou Chemical Plant, industrial grade, wherein the content of $La_2O_3$ is 26 wt %, the content of $Ce_2O_3$ is 51 wt %, and the content of the other rare earth oxides is 23 wt %) in a ratio of $NaY:RECl_3:H_2O=1:0.25:15$ under conditions of pH>3.5 and 80–95° C. for 45 min, and then filtered, washed and dried. The sample was reacted with $SiCl_4$ carried by dry air in a ratio of $NaY:SiCl_4=1:0.5$ at 550° C. for 120 min, and then purged with dry air for 60 min washed and filtered, yielding Sample No. RGY-8.

COMPARATIVE EXAMPLE

The comparative zeolite No. DB-1 was zeolite REHY, a product of Zhoucun Catalyst Plant of Qilu Petrochemical Co., having a content of $RE_2O_3$ of 13.4 wt % wherein the content of $La_2O_3$ is 8.8 wt %, the content of $Ce_2O_3$ is 2.7 wt %, and the content of the other rare earth oxides is 1.9 wt %, a unit cell constant of 2.469 nm, a differential thermal collapsed temperature of 985° C., and a NaO content of 4.4 wt %.

The comparative zeolite No. DB-2 was zeolite REY, a product of Zhoucun Catalyst Plant of Qilu Petrochemical Co., having a content of $RE_2O_3$ of 19.2 wt %, wherein the content of $La_2O_3$ is 8.7 wt %, the content of $Ce_2O_3$ is 8.8 wt %, and the content of the other rare earth oxides is 2.3 wt %, a unit cell constant of 2.465 nm, a differential thermal collapsed temperature of 967° C., and a $Na_2O$ content of 4.5 wt %.

The comparative zeolite No. DB-3 was REUSY, which was prepared by exchanging zeolite USY (a product of Zhoucun Catalyst Plant of Qilu Petrochemical Co., having a unit cell constant of 2.453 nm, an alumina content of 21 wt %, and a sodium oxide content of 3.8 wt %) having a solid content of 75% with rare earth in a ratio of $USY:RECl_3:H_2O:=1:0.21:0$ under conditions of pH>3.5 and 80–95° C. for 60 min, and then filtered, washed and dried.

The physicochemical parameters of RGY-1 to RGY-8 prepared in the above Examples 1–8 and three comparative zeolites were shown in Table 1.

TABLE 1

| Type | Unit cell size (nm) | $SiO_2/Al_2O_3$ | DTA (° C.) | $RE_2O_3$ (wt %) | $Na_2O$ (wt %) |
|---|---|---|---|---|---|
| DB-1 | 2.469 | 7.6 | 985 | 13.4 | 4.4 |
| DB-2 | 2.465 | 7.8 | 967 | 19.2 | 4.5 |
| DB-3 | 2.453 | 8.6 | 1000 | 3.6 | 1.0 |
| RGY-1 | 2.458 | 8.3 | 1005 | 14.5 | 0.24 |
| RGY-2 | 2.456 | 8.4 | 1008 | 13.4 | 0.30 |
| RGY-3 | 2.452 | 8.7 | 1015 | 9.6 | 0.26 |
| RGY-4 | 2.457 | 8.3 | 1015 | 12.9 | 0.24 |
| RGY-5 | 2.453 | 8.6 | 1001 | 11.6 | 0.16 |
| RGY-6 | 2.452 | 8.7 | 1056 | 9.0 | 0.17 |
| RGY-7 | 2.453 | 8.6 | 1031 | 5.6 | 0.23 |
| RGY-8 | 2.440 | 8.7 | 1038 | 4.5 | 0.30 |

EXAMPLE 9

The present example shows the hydrothermal stability of the zeolites provided by the present invention.

The comparative zeolites DB-1, DB-2, and DB-3 and zeolites RGY-1, RGY-2 and RGY-4 provided by Examples 1, 2, and 4 were respectively subjected to aging under severe conditions of 800° C./4 h, 100% steam and 800° C./17 h, 100% steam. The unit cell constant and the relative crystal retention of the samples after aging were shown in Table 2.

TABLE 2

| No. | Treating condition | Unit cell size (nm) | Relative crystal retention (%) |
|---|---|---|---|
| DB-1 | Fresh | 2.469 | — |
|  | 800° C./4 h | 2.441 | 40 |
|  | 800° C./17 h | 2.430 | 12 |
| DB-2 | Fresh | 2.465 | — |
|  | 800° C./4 h | 2.435 | 59 |
|  | 800° C./17 h | 2.428 | 32 |
| DB-3 | Fresh | 2.452 | — |
|  | 800° C./4 h | 2.428 | 64 |
|  | 800° C./17 h | 2.424 | 21 |
| RGY-1 | Fresh | 2.458 | — |
|  | 800° C./4 h | 2.441 | 70 |
|  | 800° C./17 h | 2.438 | 54 |
| RGY-2 | Fresh | 2.456 | — |
|  | 800° C./4 h | 2.441 | 59 |
|  | 800° C./17 h | 2.436 | 41 |
| RGY-4 | Fresh | 2.457 | — |
|  | 800° C./4 h | 2.438 | 57 |
|  | 800° C./17 h | 2.439 | 63 |

As can be seen from Table 2 that zeolites provided by the present invention have higher hydrothermal stability, larger unit cell constant and better relative crystal retention as compared with those of the comparative zeolites after being treated under sever conditions.

EXAMPLE 10

The present example shows the performance evaluation of zeolite Y provided by the present invention in a microreactor using a heavy oil.

The conditions for evaluation were: zeolite loading of 4 g, vacuum gas oil as feedstock, the properties of which were shown in Table 3, a reaction temperature of 520° C., a weight hourly space velocity of 16 h$^{-1}$, and a catalyst to oil ratio of 3.0.

The contents of various components in reaction were analyzed by gas chromatography.

Comparative zeolites DB-1, DB-3 and zeolites RGY-2, RGY-4, and RGY-6 were evaluated in a microreactor using a heavy oil after aging under severe conditions of 800° C./17 h, 100% steam, the results were shown in Table 4.

TABLE 3

| Parameters of feedstock | Vacuum gas oil |
|---|---|
| Specific gravity, g/cm$^3$ | 0.8652 |
| Viscosity, mm$^2$/s | |
| 50° C. | 14.58 |
| 100° C. | 4.37 |
| Residual carbon, wt % | 0.04 |
| Boiling range, ° C. | |
| Initial boiling point | 227 |
| 5% | 274 |
| 10% | 289 |
| 20% | 322 |
| 30% | 347 |
| 40% | 373 |
| 50% | 389 |
| 60% | 401 |
| 70% | 417 |
| 80% | 431 |
| 90% | 446 |
| 95% | 458 |
| Dry point | 478 |

TABLE 4

| | No. | | | | |
|---|---|---|---|---|---|
| | Comparative Example | | Example | | |
| Item | DB-1 | DB-3 | RGY-2 | RGY-4 | RGY-6 |
| 800° C./17 h, MA | 80 | 66 | 77 | 68 | 68 |
| Product distribution (wt %) | | | | | |
| Gas | 18.3 | 11.7 | 14.7 | 11.1 | 11.4 |
| Coke | 1.2 | 1.0 | 1.2 | 1.0 | 0.8 |
| Gasoline | 57.2 | 57.0 | 60.1 | 59.9 | 58.8 |
| Diesel | 16.2 | 16.3 | 12.4 | 16.7 | 17.0 |
| >330° C. | 7.1 | 14.0 | 11.6 | 11.3 | 12.0 |
| Conversion | 76.7 | 69.7 | 76.0 | 72.0 | 71.0 |
| $\Sigma C_4^0/\Sigma C_4^-$ | 1.1 | 0.94 | 2.5 | 1.6 | 1.6 |

As can be seen from Table 4, as compared to DB-1, the rare earth Y type zeolite RGY-2 provided by the present invention has higher yield of light oils, lower yield of dry gas under the similar conversion ratio, in particular, a hydrogen transfer index $\Sigma C_4^0/\Sigma C_4^-$ is nearly 1.4 unit higher than that of the comparative zeolite DB-1.

Compared to DB-3, the rare earth Y-type zeolite RGY-6 of the present invention has stronger ability for converting heavy oil under the similar conversion ratio, and the hydrogen transfer activity index $\Sigma C_4^0/\Sigma C_4^-$ was nearly 0.7 unit higher than that of DB-3, showing that the zeolite product provided by the present invention has stronger ability for converting heavy oil, higher activity, higher selectivity and hydrogen transfer activity.

As can also be seen from Table 4 that the rare earth zeolite Y provided by the present invention has comparable or less coke selectivity to the comparative zeolites in case that the hydrogen transfer activity of the former was higher than that of the latter.

What is claimed is:

1. A process for preparing a rare earth zeolite Y comprising drying the rare earth-containing zeolite Y so that its water content is less than 10 wt %, introducing gaseous silicon tetrachloride carried by dry air in a silicon tetrachloride to zeolite Y weight ratio of 0.1–0.9:1, reacting at the temperature of 150–600° C. for 10 mm to 6 h, then purging with dry air for 5mm to 2 hr, and washing with de-cationized water to remove the residual soluble by-products such as Na$^+$, Cl$^-$, Al$^{3+}$ and the like in the zeolite, wherein the zeolite Y has an intracrystalline rare earth content of 4–15 wt % on the basis of RE$_2$O$_3$, a unit cell constant of 2.450–2.458 nm, and a differential thermal collapsed temperature of 1000–1056° C.

2. The process according to claim 1, wherein said rare earth-containing zeolite Y is selected from the group of the commercial products of REY, REHY, or the product derived from NaY exchanged by rare earth, with or without drying.

3. The process according to claim 2, wherein the content of the rare earth in said commercial product REHY on the basis of RE$_2$O$_3$ is 6–14 wt %, and the content of Na$_2$O is higher than 4 wt %.

4. The process according to claim 2, wherein the content of the rare earth in said commercial product REY on the basis of RE$_2$O$_3$ is 10–20 wt %, and the content of Na$_2$O is higher than 2 wt %.

5. The process according to claim 2, wherein the procedure of the rare earth exchanged zeolite Y compring: the zeolite NaY having a silica to alumina ratio higher than 3.5 is exchanged with an aqueous solution of rare earth chloride for 30–60 mm in a weight ratio of NaY:RECl$_3$:H$_2$O= 1:0.1–0.25:5–15 under conditions of pH>3.5 and a temperature of 80–95° C.

6. The process according to claim 1, wherein the water content in said rare earth-containing zeolite Y after drying is less than 5 wt %.

7. The process according to claim 1, wherein said reaction temperature is 200–500° C.

8. A process for preparing a rare earth zeolite Y comprising treating zeolite Y with silicon tetrachloride, wherein the treated zeolite has an intracrystalline rare earth content of 4–15 wt % on the basis of RE$_2$O$_3$, a unit cell constant of 2.450–2.458 nm, and a differential thermal collapsed temperature of 1000–1056° C.

* * * * *

UNITED STATES PATENT AND TRADEMARK OFFICE
CERTIFICATE OF CORRECTION

PATENT NO. : 6,787,123 B2
DATED : September 7, 2004
INVENTOR(S) : J. Du et al.

It is certified that error appears in the above-identified patent and that said Letters Patent is hereby corrected as shown below:

Column 8,
Line 21, "5mm" should be -- 5 min --.
Line 41, "compring" should be -- comprising --.
Line 44, "30-60mm" should be -- 30-60 min --.

Signed and Sealed this

Seventh Day of June, 2005

JON W. DUDAS
*Director of the United States Patent and Trademark Office*